United States Patent [19]

Smith

[11] Patent Number: 5,758,513

[45] Date of Patent: Jun. 2, 1998

[54] INSULATED BEVERAGE COOLER SYSTEM

[76] Inventor: Ronald William Smith, 4039 W. Sharon Ave., Phoenix, Ariz. 85029

[21] Appl. No.: 697,531

[22] Filed: Aug. 26, 1996

[51] Int. Cl.⁶ .................................... F25D 3/08
[52] U.S. Cl. .................. 62/457.5; 62/457.2; 62/530; 62/371
[58] Field of Search .............. 62/371, 372, 457.1, 62/457.2, 457.4, 457.5, 457.7, 457.9, 529, 530

[56] References Cited

U.S. PATENT DOCUMENTS

| 4,281,520 | 8/1981 | Norwood | 62/457.4 |
| 5,095,718 | 3/1992 | Ormond et al. | 62/457.5 |

*Primary Examiner*—John M. Sollecito
*Attorney, Agent, or Firm*—Gregory J. Nelson

[57] ABSTRACT

A portable insulated cooler system for beverages which includes one or more bottles containing a freezable coolant refrigerant. The bottles define recesses for receiving the housed beverage containers. An insulated casing or liner extends about the bottle to maintain and contain containers in a cool condition for an extended period of time. The bottles and casing are inserted into a fabric carrying case for convenience of the user. The carrying case, bottles and insulative casing may be configured so that the cooler may be comfortably carried by the user in a manner similar to a "fanny pack". In other embodiments, the bottles containing the refrigerant are identical one to the other and are positioned in face-to-face relationship to form a plurality of cooling chambers. The cooler may also be placed in another article for transportation such as within the large side pocket of a golf bag. The modular system allows the user to assemble a cooler of the desired capacity by assembling the selecting bottle, liner and case components.

7 Claims, 4 Drawing Sheets

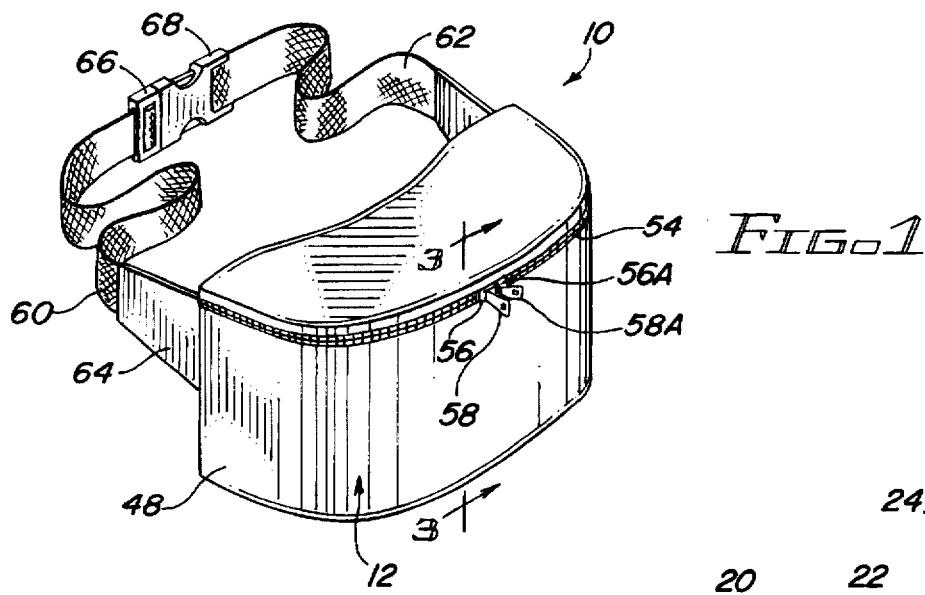
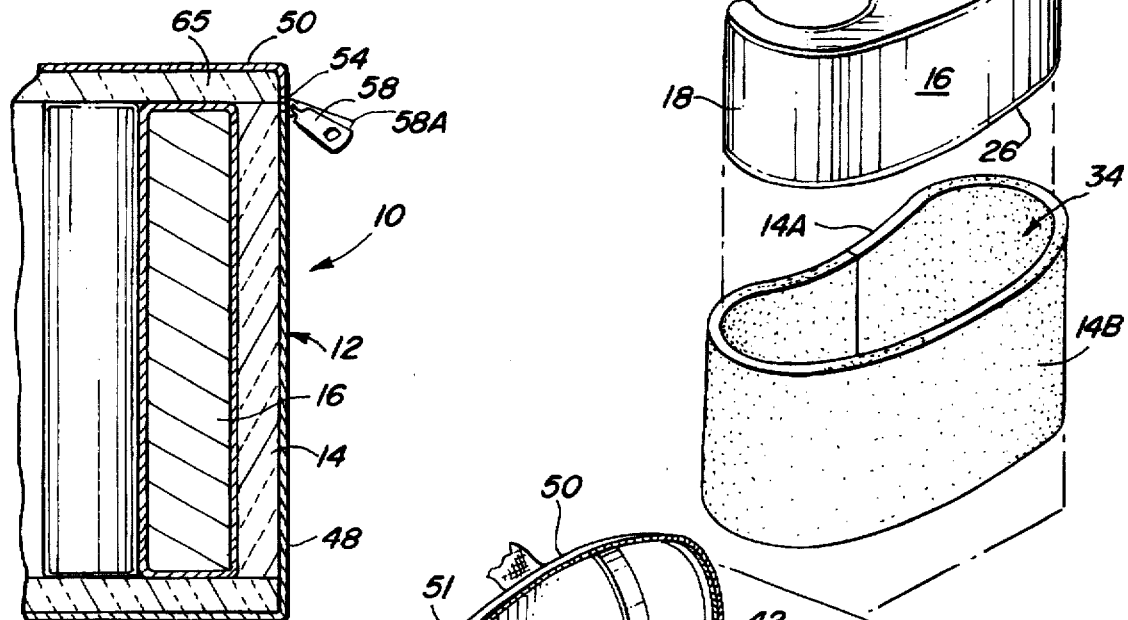
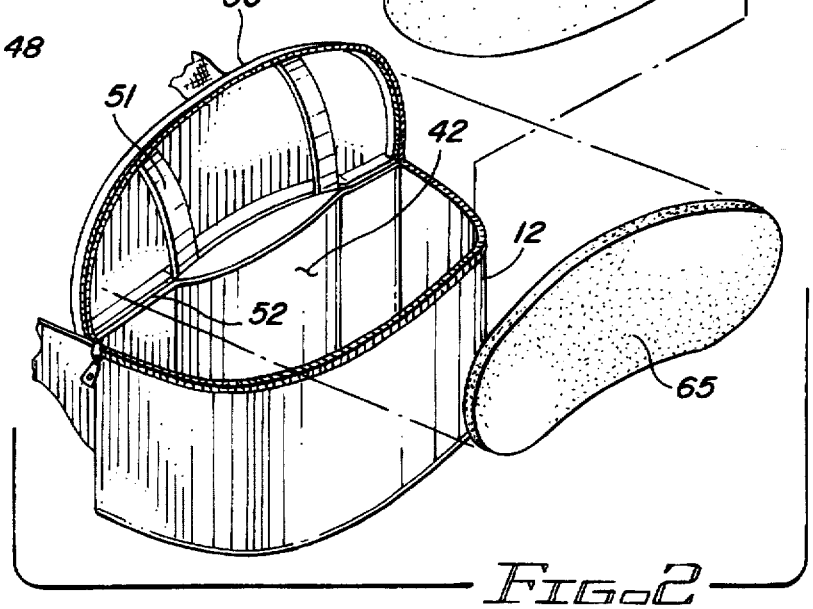

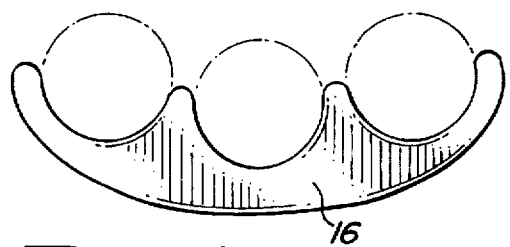
FIG.4
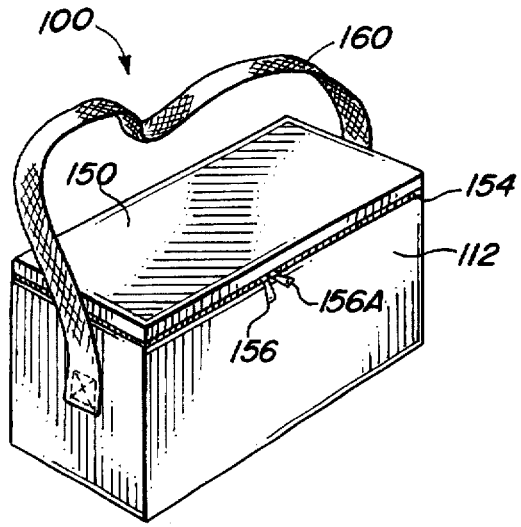
FIG.5
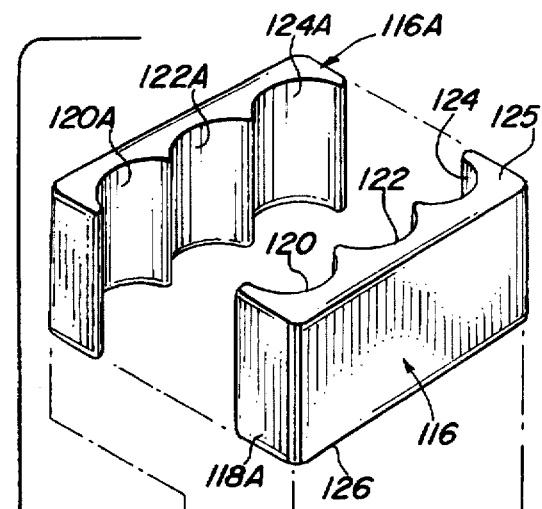
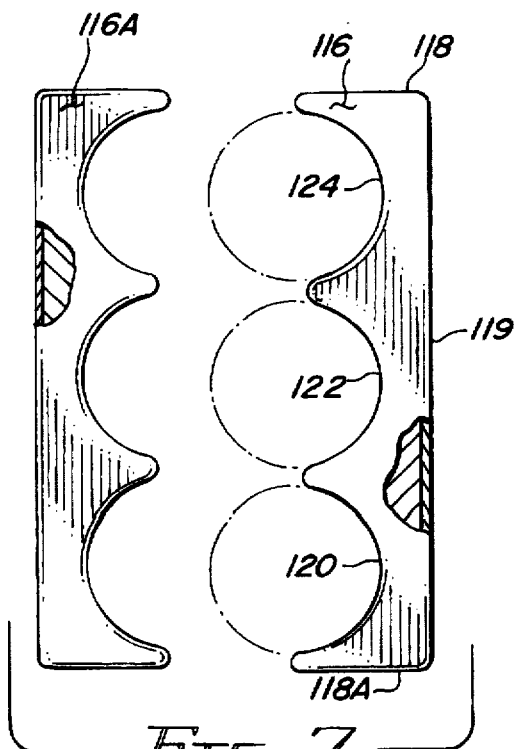
FIG.7
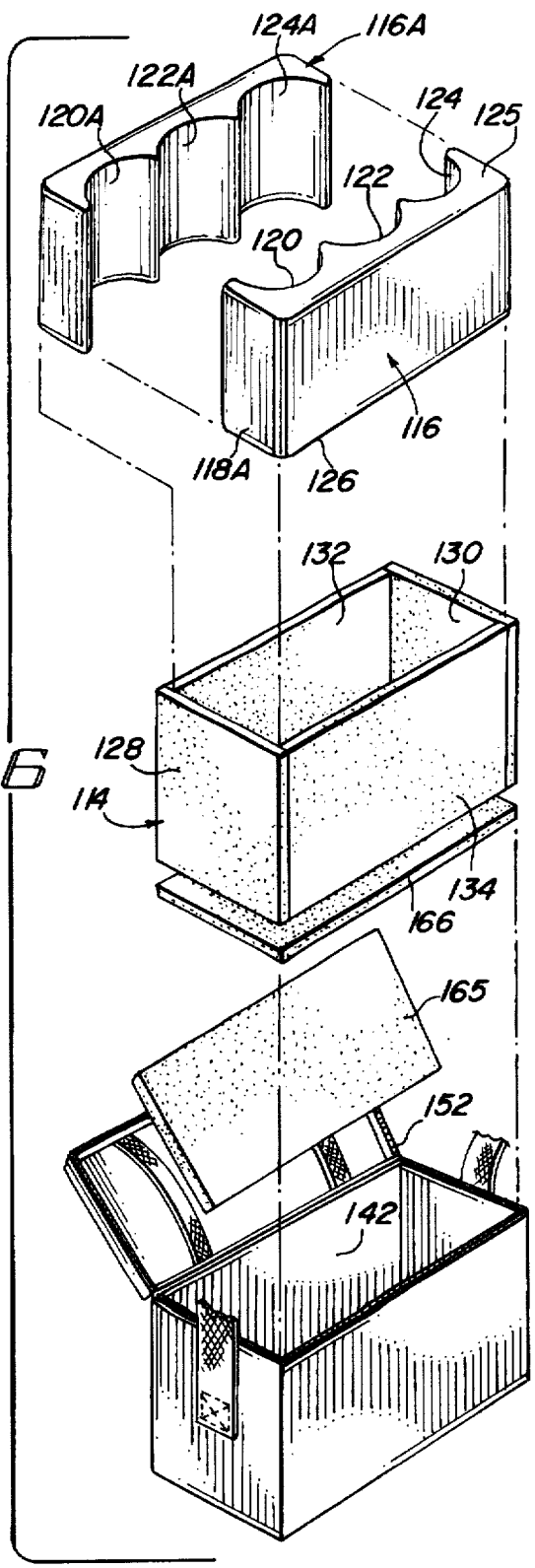
FIG.6

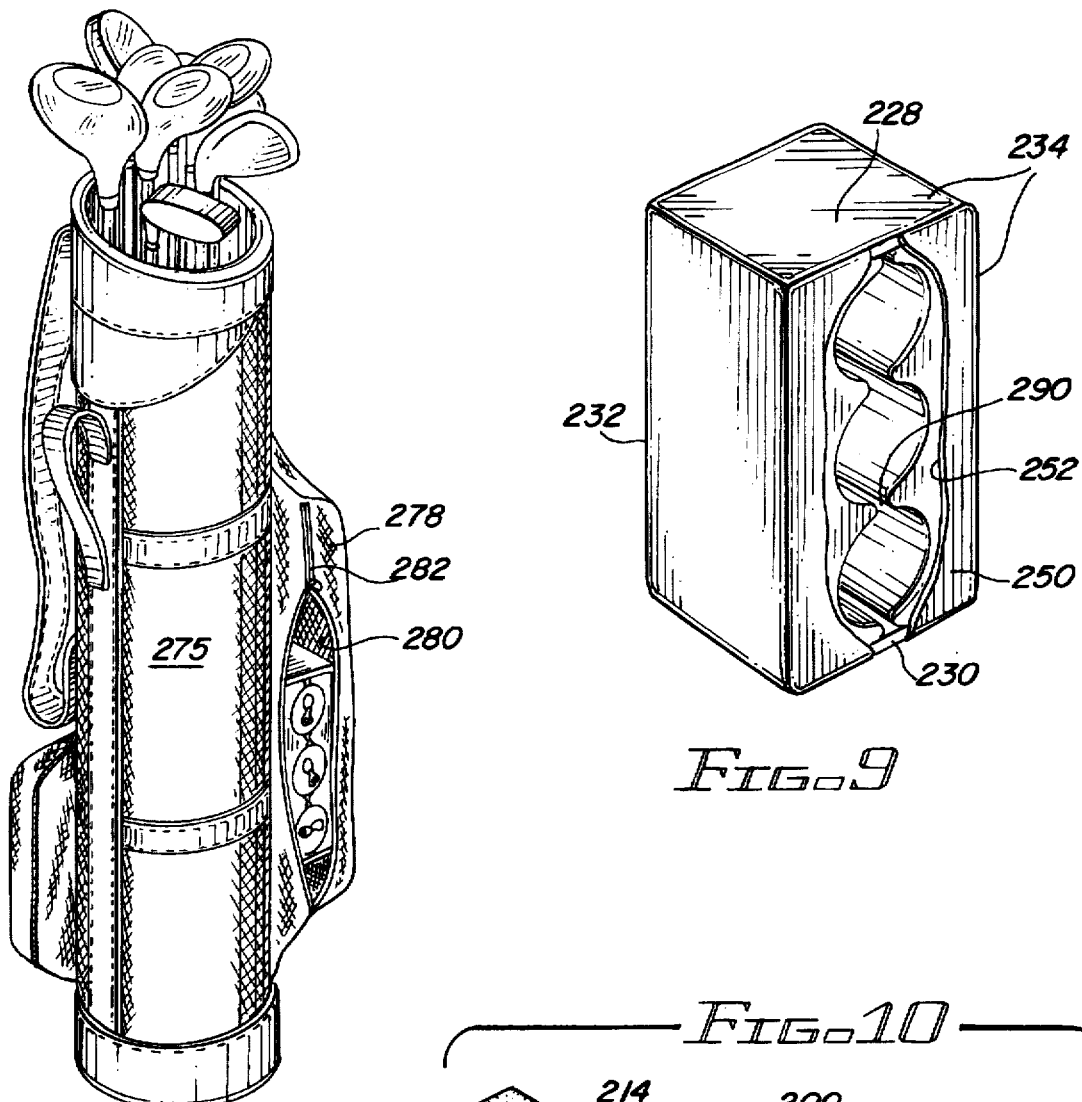
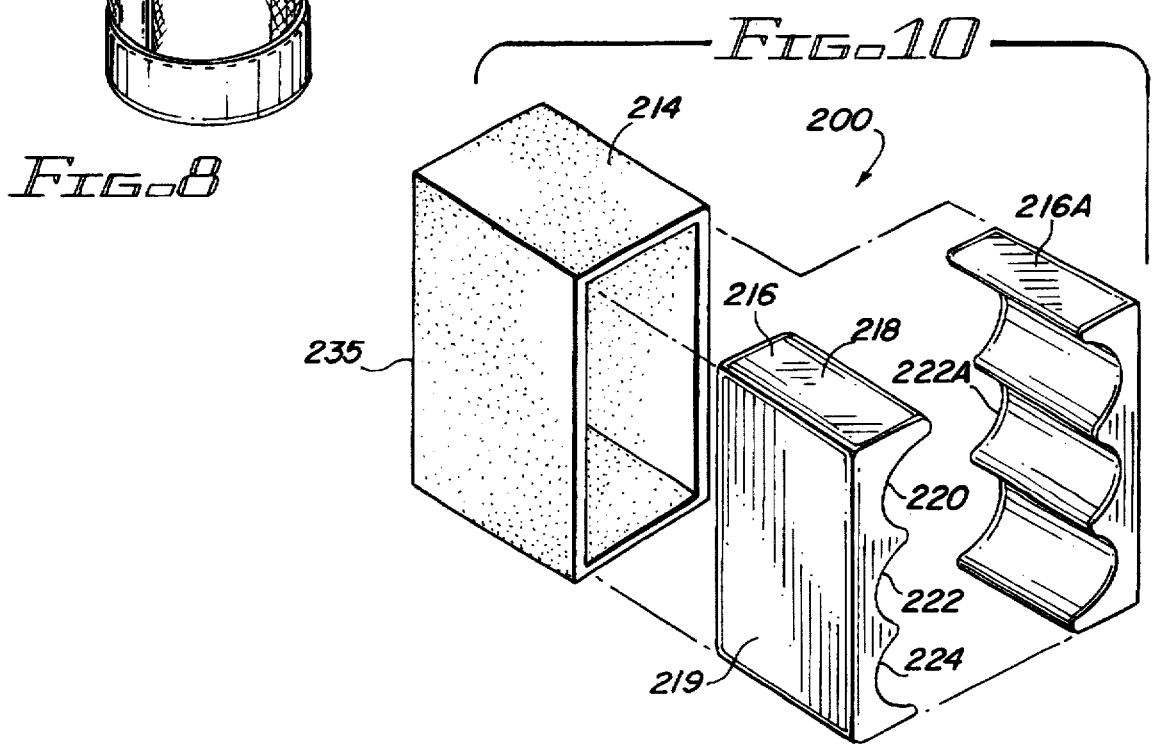

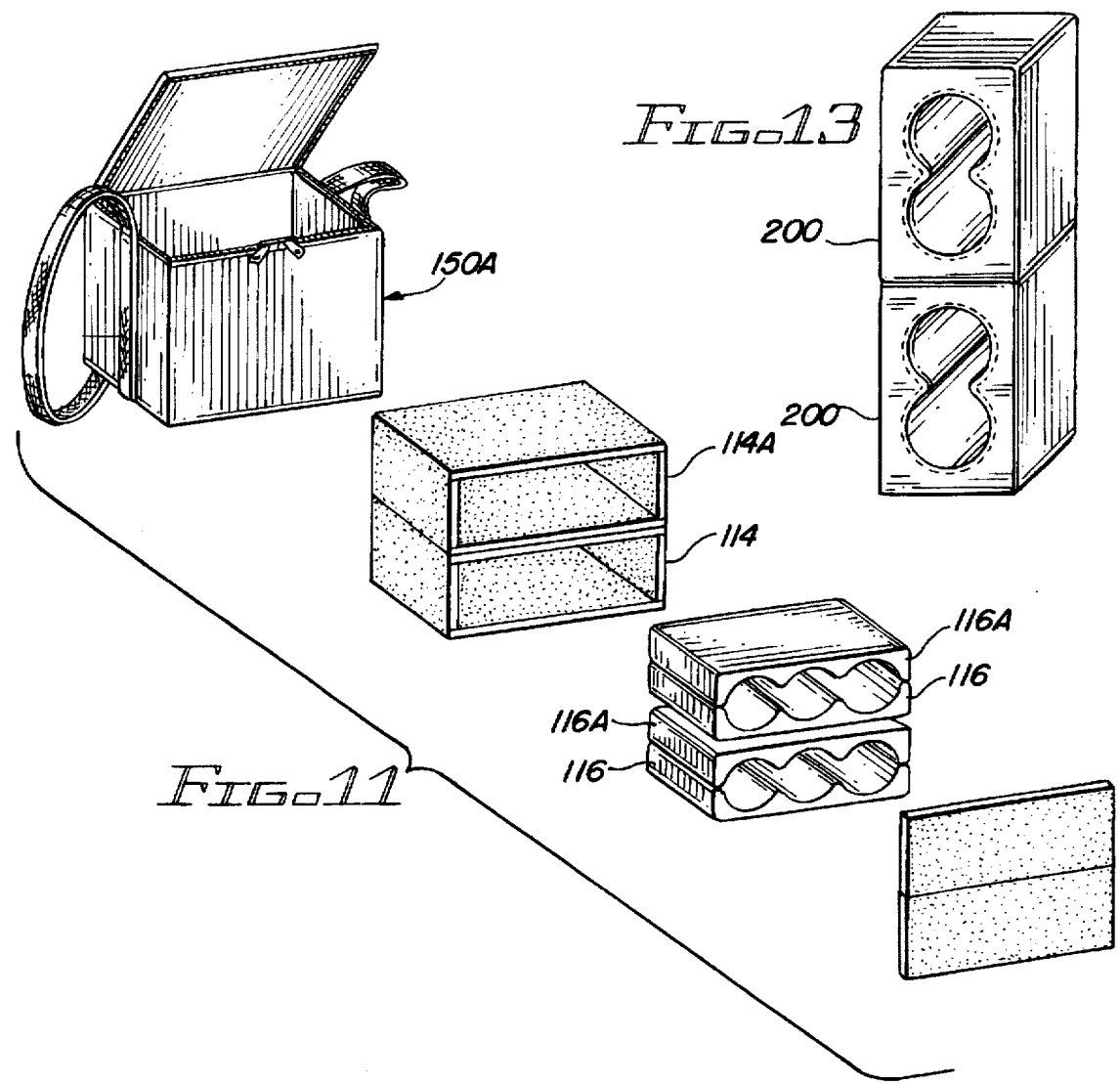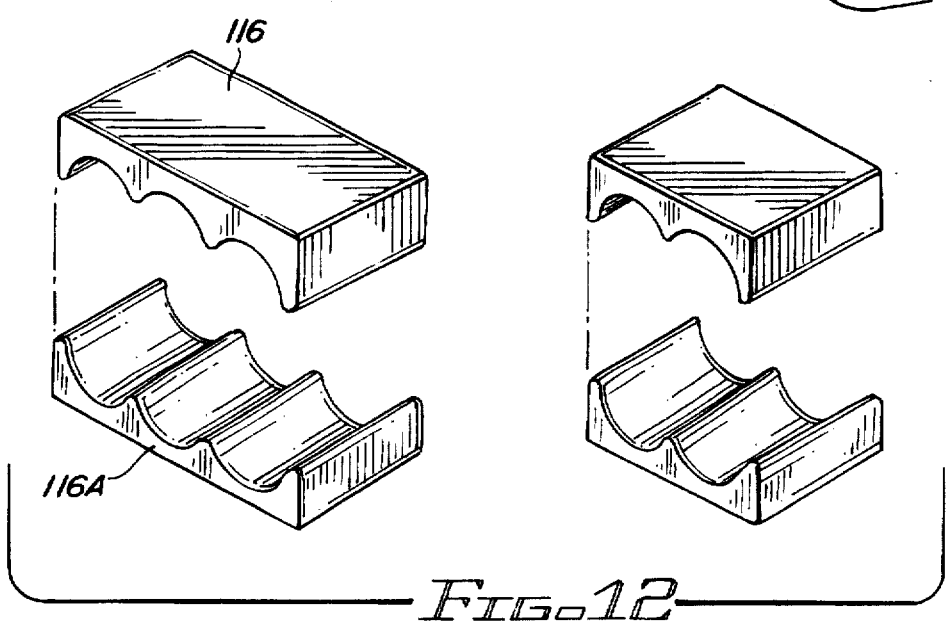

INSULATED BEVERAGE COOLER SYSTEM

FIELD OF THE INVENTION

The present invention relates to an insulated cooler system for canned and bottled beverages and more particularly relates to a system having as a component a cooling element termed a "bottle" in which the containers to be cooled are inserted. The system also includes a polymeric foam casing extending about the bottle and an exterior member such as a carrying bag which retains the cooler components together. The cooler system is modular permitting the user to remove, select and interchange components as required to facilitate cleaning, replacement and to accommodate the required capacity.

BACKGROUND OF THE INVENTION

A wide variety of portable coolers for maintaining beverages in a chilled condition are known. Portable coolers, which are non-electric relying on a previously frozen or chilled medium, are generally effective and are widely used. Nevertheless, there are problems associated with their use including accessibility of stored containers, bulky cooler design, ineffective insulation, difficulty in cleaning and lack of convenience.

The following patents are representative of the general art of insulated beverage containers.

U.S. Pat. No. 4,620,426 shows an insulated beverage container having an outer casing with an interior foam housing. The foam housing is shaped to accommodate at least two conventional beverage containers. Containers of the Blue Ice cold pack type are located above the beverage cans.

U.S. Pat. No. 4,441,336 shows a portable cooler having a lid and a food compartment. A bottle is filled with water and is frozen. The bottle has opposed, corrugated surfaces with concavities which contact the contained beverages.

U.S. Pat. No. 4,295,345 discloses a reusable container for carrying and cooling beverages defining a plurality of cylindrical compartments. The top section includes a slow-warming, cooling gel.

U.S. Pat. No. 4,266,407 discloses a portable cooler having two molded insulating storage container sections having matching recesses for receiving beverage containers. The sections close over the containers to bring a frozen, removable cold pack into contact with the container. The molded storage containers can be inserted within the pocket of a fabric carrier so that the unit can be hand-held or carried on a belt.

U.S. Pat. No. 4,747,274 shows a device for cooling beverage containers which has a cooling element in the form of a block or plate-shaped hollow body that is filled with a cooling media.

U.S. Pat. No. 5,007,250 shows a portable insulated cooling container. The cooling container has a canvas body with an insulating mat of foam or other material on the interior sides of the fabric housing. A coolant material is contained in a hollow, sealed case that encloses a refrigerant such as Blue Ice, the case being scalloped to receive the cans. The coolant material is refrigerated prior to being placed into the compartment of the container.

OBJECTS OF THE INVENTION

In view of the foregoing, it is a broad object of the present invention to provide an insulated, portable cooling system for canned and bottled liquids and beverages having at least three components including one or more reusable bottles which contain a freezable liquid which form a compartment for receiving cans or bottles to be cooled; a removable insulative foam cover; and a carrying case.

Another object of the present invention is to provide a beverage cooler system having as modular components, reusable bottles, a foam casing or cover and an exterior carrying case which, when assembled into a cooler, can be hand carried or worn around the waist of the user. The modular configuration permits the user to selectively assemble these components into a cooler of the desired configuration.

Another object of the present invention is to provide an insulated cooling container for beverages which has a bottle containing a freezable liquid, an insulated container and an exterior case which unit is adapted to be inserted into the pocket of a carried object such as the pocket of a golf bag.

SUMMARY OF THE INVENTION

The present invention, in the various preferred embodiments disclosed herein, provides a unique beverage cooler system that accomplishes the foregoing objects by providing an insulated cooler for canned or bottled beverages which has an outer soft fabric case having a suitable closure such as a fastener or a zipper. The case may have a shoulder strap or may have a strap for attachment around the waist of the wearer. Within the fabric case is a layer of insulation which is in the form of a removable casing and preferably is a cross-linked polymeric foam material. The casing is removable as a unit or in sections to accommodate washing and cleaning. The cooling bottles, which may consist of either one or several mating components, are housed within the insulation casing. The bottles contain a refrigerant or coolant that may be frozen or chilled prior to use. The bottle assembly has one or more recesses in which the beverage containers are received or nest. The modular components may be assembled in a compact personal cooler containing a single bottle or assembled in a larger cooler assembly having multiple bottles for increased capacity.

In another embodiment the cooler is generally kidney-shaped so that it may be comfortably carried around the waist of the user. In another embodiment, the cooler has an exterior cover which secures the insulation casing about the bottles and is designed so the cooler is adapted to be placed in the pocket of another object, such as the large side or shoe pocket of a golf bag. The bag may have auxiliary pockets and may include mounting attachments for bicycles, motorcycles and other recreational vehicles.

The above as well as other objects and advantages of the present invention will become apparent from the following detailed description of the preferred embodiments taken in conjunction with the accompanying drawings in which:

BRIEF DESCRIPTION OF THE DRAWINGS

FIG. 1 is a perspective view of an embodiment of the cooler of the present invention;

FIG. 2 is an exploded view of the cooler shown in FIG. 1;

FIG. 3 is a detailed sectional view taken along line 3—3 of FIG. 1;

FIG. 4 is a top view of the bottle portion of the cooler showing beverage containers nested within the bottle, the beverage containers being shown in dotted lines;

FIG. 5 is a perspective view of an alternate embodiment of a cooler according to the present invention;

3

FIG. 6 is an exploded view of the cooler shown in FIG. 5;

FIG. 7 is a top view showing a pair of bottles with beverage containers being shown in dotted lines;

FIG. 8 is a perspective view of a golf bag having a pocket containing another embodiment of a cooler according to the present invention;

FIG. 9 is a perspective view of the cooler shown in FIG. 8;

FIG. 10 is an exploded view of the cooler shown in FIGS. 8 and 9;

FIG. 11 is a perspective view showing an alternate embodiment similar to that shown in FIGS. 5 to 7 which alternate embodiment utilizes the same or similar components to achieve increased capacity;

FIG. 12 is a perspective view showing the bottles removed from the cooler and in a compact nesting position for storage; and FIG. 13 is a perspective view of the cooler of FIGS. 8 to 10 shown assembled in a multiple bottle configuration for increased capacity.

DETAILED DESCRIPTION OF THE DRAWINGS

Turning now to the drawings, FIGS. 1 through 4 illustrate a cooler according to a preferred embodiment of the present invention which is generally designated by the numeral 10. The cooler system has three basic components which will be described in detail include an outer bag or case 12, an insulative casing 14 and an interior bottle 16. The term "bottle" is a term of art which refers to the coolant-containing member which is frozen or chilled.

The bottle 16 has a generally arcuate outer wall 18 and an inner surface which defines three adjacent vertically extending generally semi-cylindrical concavities 20, 22 and 24. The construction of the bottle is completed by an up top surface 25 and a lower surface 26. The bottle is hollow and is preferably formed as by blow molding by a suitable plastic material such as polyethylene and contains a suitable coolant or refrigerant which may be water but is preferably a mixture such as water and glycerin or the refrigerant such as is sold under the trademark Blue Ice. The bottle is placed in a freezer or refrigerator to be chilled or the contents frozen prior to being placed in use in the cooler.

The vertical height of the bottle is slightly less than the height of conventional beverage cans such as conventional 12 oz. cola or malt beverage containers. This allows for convenient accessibility. The recesses 20, 22 and 24 conform to the curvature of the exterior of beverage containers of this type. In use, beverage containers are placed in the recesses in nesting engagement with the bottle so that the containers and their contents are cooled as a result of the contact with the refrigerated or chilled bottle. The bottle containing the beverage containers to be cooled is received within the insulative casing 14.

The insulative casing 14 is generally reniform as seen in a plan view and is fabricated from a suitable insulative material such as a cross-linked polyethylene expanded foam. The casing 14 is shown as having a continuous exterior shell with a rear concave section 14A and a front convex section 14B which together with the opposite ends establish the general shape. The casing defines a compartment 34 which snugly receives the bottle 16 and any contained or housed beverage containers. The insulative casing 14 has a height approximately corresponding to or slightly greater than the height of the bottle 16. The insulative casing also serves to assist in retaining the cans within the arcuate recesses 20, 22 and 24 of the bottle.

4

In use, the bottle and insulative casing are received within the interior compartment 42 of the exterior case 12. The case 12 is preferably of soft sided construction having a shell 48 of a suitable material such as a water-resistant fabric with nylon being preferred. The shell 48 has a configuration generally conforming to the reniform configuration of the insulative casing 14 and is slightly larger providing clearance so that the casing, bottle and beverage containers can be easily placed within the compartment 42. The height of the case 12 is also selected to accommodate the components 14 and 16. A cover 50 is attached to the rear of the bag at hinge section 52 and is shown in the open position in FIG. 2. In the closed position, the cover may be secured to the body of the case by a suitable closure which is shown as a zipper 54 having a pair of slides 56 and 56A each having associated tabs 58 and 58A permitting the cover to be closed by moving the slides to a central position as shown in FIG. 1. Alternatively, other types of closure devices such as well known fabric fasteners of the loop and hook type such as those sold under the trademark Velcro® may be used.

The embodiment of the cooler shown in FIG. 1 is a personal cooler adapted to be carried by a user or worn by the user similar to devices which are commonly termed "fanny packs". The cooler is normally positioned at the rear of the waist of the user with the concave portion 14A disposed toward the lower back or lumbar portion of the body of the wearer. A pair of opposite straps 60 and 62, which may be nylon, leather or other suitable fabric material, extend oppositely from tabs 64 at opposite sides of the outer case or bag 12. The straps may be adjustable in length and extend to the front of the body of the user where they may be joined by male and female buckle components 66 and 68.

To use the container, the outer carrying case 12 is opened at zipper 54 by means of the zipper slides 56 and 56A. The bottle 16 is removed from its position within the insulative casing and placed in a cold environment such as the freezer section of a refrigerator. The bottle is left for a sufficient period of time so as to freeze the coolant or refrigerant contained within the bottle. The bottle is then replaced within the insulative casing 14. From one to three beverage containers can then be inserted within the arcuate recesses 20, 22, and 24. The insulative cover 65 is positioned over the top of the beverage containers and the top surface 25 of the bottle and held in place by fabric retaining straps 51 sewn into the interior of cover 50. The cover 50 of the case is then closed and the user may either carry the cooler using the straps 60, 62 or position the cooler with the cans in an upright position with the cooler located at the rear of the waist of the user by extending the opposite straps about the user's waist and securing the buckle components 66 and 68.

Easy and convenient access is provided as the cooler can be accessed by removing the cooler from the user's waist and the bag opened to provide access to the beverage containers which will have been maintained in a cooled condition by the chilled or frozen bottle 16. The design of the bottle, casing and bag components provide both a functional and attractive appearance. The shape of the bottle 16 which extends about a substantial portion of the periphery of the housed beverage containers will maintain the contents of the containers in a cold or cool condition for a long period of time. Heat loss is minimized by the insulative casing 14. The portion of the cooler which directly contacts the back of the user when worn in the style of a "fanny pack" provides a comfortable fit. The foam casing provides cushioning against the body of the user and when carried in this fashion prevents any portion of the chilled or cold bottle from coming in direct contact with the body of the user.

When it is necessary to clean the components of the cooler, they can be conveniently separated and removed as shown in FIG. 2 for washing or cleaning as required.

Turning to FIGS. 5 to 7 an alternate embodiment of the cooler system of the present invention is shown which is generally designated by the numeral 100. The cooler of embodiment 100 as shown is adapted to cool and maintain in a cool condition a selected number of beverage containers such as three 12 oz. beverage cans or 10 oz. bottles or a combination of such beverage containers. The embodiment 100 consists of an exterior bag or case 112, an insulative casing or liner 114 and a pair of chillable or freezable bottles 116 and 116A. The design of this embodiment is compact and provides a construction in which the beverage containers to be cooled, which may consist of both cans or bottles, are substantially enclosed within the ice substitute bottles 116 and 116A.

The bottles 116 and 116A are hollow and formed by a blow mold or other fabrication technique and each contains a suitable refrigerant such as water, water and glycerine or other fluids or materials which may be chilled or frozen to maintain a low temperature. Each of the bottles 116 and 116A has end walls 118 and 118A, outer wall 119 and opposite top and bottom surfaces 125 and 126. Wall 118 and 119 are substantially planar. The inwardly disposed surface of each of the bottles defines a plurality of vertically extending semi-cylindrical recesses 120, 122 and 124. Similarly, bottle section 116A defines semi-cylindrical recesses 120A, 122A and 124A.

As best seen in FIG. 7, it will be seen when the bottle sections 116 and 116A are disposed in opposing relationship, a plurality of generally cylindrical cooling chambers are formed which are each sized to receive a beverage container such as a bottle or can. When the bottles 116 and 116A are chilled or the contents frozen, the exterior surfaces of a housed beverage container are substantially in complete contact with the bottles to achieve and maintain the maximum cooling effect. An advantage of this construction is that the bottle sections 116 and 116A are essentially identical and may be fabricated by the same tooling, thus achieving economy of manufacture. Further, the fact that the bottle sections 116 and 116A are separable facilitates cleaning and also allows for easy insertion and removal of beverage containers. Another advantage, as illustrated in FIG. 12, is that the bottles are nestable to conserve space when stored or placed in a freezer. The two bottles occupy about the same space as a single ice cube tray.

The coolant containing bottles 116 and 116A are inserted into an insulated casing 114. The casing is generally rectangular having end walls 128 and 130 and side walls 132 and 134 which are made of a suitable insulative material such as cross-linked, expanded polyethylene foam having a density of 2 PCF. The separate rectangular bottom panel 166 and a top panel 165 complete the insulated enclosure. The top and bottom panels are also made from a suitable material such as polyethylene and it is preferred that the bottom panel be made from a denser material for additional strength such as 4 PCF cross-link polyethylene foam. The insulative material is also preferably waterproof and is cleanable.

In use, the containers to be cooled are inserted between the refrigerated or chilled bottles 116 and 116A. The bottles 116 and 116A and beverage containers are inserted within the rectangular insulated casing. The top and bottom panels 166 and 165 are inserted within the compartment 142 of the exterior carrier bag 112.

The carrier bag is fabricated from a suitable light-weight moisture resistant fabric material such as nylon and conforms to the shape of the insulation casing. A cover 150 is secured at a fabric hinge to the carrier bag. The top or cover 150 may be closed by means of a peripherally extending zipper 154 having slide members 156 and 156A. One or more exterior surfaces of the carrier bag may be provided with compartments for storage of additional items. A flexible strap 160 of nylon webbing or similar material extends between the opposite sides of the carrier bag and is secured thereto by stitching.

In other respects, the cooler shown in FIGS. 4 through 7 is similar to that described with respect to FIGS. 1 through 4. Beverage containers to be cooled can be inserted between the sections of the frozen or chilled bottle and placed within the insulative housing which is then received within the exterior carrier convenience. Access to the cooled beverage containers is achieved opening the top 150 by moving zipper slides 156 to an open position to lift the cover 150 and panel 167.

The device can be easily stored and cleaned as the components are separable. The bottle components 116 and 116A may be stored in the refrigerator or freezer when not in use so they will be maintained in a frozen or chilled condition for use. The remaining components, namely the carrier bag and insulation are lightweight and flexible and may be easily stored in a compact condition.

As seen in FIG. 11, the cooler system allows the user to select components to achieve the desired capacity cooler. In FIG. 11, a plurality of pairs of bottles 116 and 116A have been arranged in a pair of outer liners 114, 114A and bag 150A to accept up to 6 beverage containers. The modular design permits use of the same bottles and liners as used in the FIGS. 5 to 7 embodiment. The user would be provided exterior bags 150A in several sizes and the user may then assemble a cooler sized in accordance with the user's requirements. For example, the components can be assembled to accept 9 or 12 beverage containers.

Another embodiment of the present invention is shown in FIGS. 8 through 10. This embodiment, generally designated by the numeral 200, is designed for convenient access when the cooler 200 is to be inserted or carried in another article. The cooler 200 is provided with bottles 216 and 216A which are essentially identical and can be positioned as shown in FIGS. 9 and 10 to enclose a plurality of beverage containers. The bottles 216 and 216A each contain a suitable refrigerant or coolant and have a generally planar rear surface 219, opposite ends 218, and an interior surface which defines a plurality of semi-cylindrical concavities or recesses 220, 222 and 224. The bottles 216 and 216A are insertable within a compartment within the insulative casing 214. The insulative casing 214 is generally rectangular having opposite side walls 232 and 234 and end walls 228 and 230 and is constructed of a suitable material such as a cross-linked, polyethylene expanded foam. The casing 214 may be provided with a rear wall 235. The front of the casing is open for convenient insertion of the bottles 216 and 216A and the housed beverage containers. The insulative casing, coolant containing bottles and beverage containers are secured together by an exterior fabric cover 250 which extends over the bottles. The cover 250 has an opening 252 which registers with the beverage compartments 220, 222 and 224. The cover is elasticized so that it stretches to facilitate its placement about the bottles and liners and so it will maintain the components together as best seen in FIG. 9.

In FIG. 8, the cooler assembly is shown inserted in another article which in this case is shown as a golf bag 275 of conventional construction having a large side pocket 278 with an opening 280 which may be enclosed by means of a zipper 282 once the containers are in the position shown.

The cooler of this embodiment is adapted to be carried in the pocket of another article, such as a golf bag or the like. The cooler and beverage containers are preferably positioned in use as shown in FIG. 8 so that convenient access to the beverage containers is provided. To facilitate grasping the containers, a small clearance space may be provided between the edges of the cooler bottles when the bottles 216 and 216A are assembled. The clearance space is indicated by the numeral 290 at the opposite edges of the intermediate recesses 222 and 222A. The clearance allows the user to easily grasp the center beverage container and once it is removed, access to the outermost stored containers is facilitated.

In FIG. 13, a plurality of individual coolers 200 are shown vertically stacked. In this position, a user may insert several such coolers into a space, the number and size of the cooler being selected in accordance with available space.

As will be seen from the foregoing, the present invention provides a unique cooler having specially designed bottles with an ice substitute, an insulating foam casing and in some instances a carrying case. The components are intended to facilitate efficient fabrication and permit easy separation for cleaning. The design is compact and will maintain contained beverages cooled for a extended periods of time in even the severest climatic conditions.

It will be seen from the foregoing while the present invention has been described with respect to several preferred embodiments thereof, those skilled in the art may make various modifications, alterations and changes. To the extent these various alterations, changes and modifications do not depart from the spirit and scope of the appended claims, they are intended to be encompassed therein.

We claim:

1. A modular beverage cooler system for maintaining beverage containers of the type having a cylindrical body and an end in a cooled condition, said cooler system comprising:

(a) at least two bottles having a substantially planar outer wall and opposite end walls, an inner wall, and opposite top and bottom walls, said bottles each containing a coolant;

(b) said inner walls defining at least two side-by-side recesses extending from said top to said bottom wall, said bottle end walls extending to a height approximately corresponding to the middle of the body of a contained container;

(c) said bottles being positionable in joined relationship with said recesses in each bottle facing one another to define a plurality of generally cylindrical compartments for nestably receiving said beverage containers with said opposed bottles in engagement at said end walls; and (d) an exterior case defining a compartment having a particular shape and size configured to receive said bottles in close mating relationship to each of said outer walls and said engaged end walls of said bottles when said bottles are positioned facing one another in joined relationship.

2. The modular beverage cooler system of claim 1 wherein said bottle is formed from a plastic material and is hollow containing an ice substitute.

3. The modular beverage cooler system of claim 1 wherein said bag comprises a soft side carrying bag.

4. The modular beverage cooler system of claim 1 further including removable insulating means disposed between said bottles and said case.

5. The modular beverage cooler system of claim 4 including a plurality of pairs of bottles.

6. The modular beverage cooler system of claim 5 including a plurality of cases sized to accommodate from one pair of bottles to a plurality of bottles.

7. The modular beverage cooler system of claim 1 wherein said case has a cover with an open and closed position, said cover extending across the top of said bottles whereby in said open position the ends of said containers are accessible.

* * * * *